United States Patent [19]

Yamamoto et al.

[11] 4,226,816

[45] Oct. 7, 1980

[54] METHOD OF MANUFACTURING A CLUTCH FACING OF THE TYPE USED FOR AUTOMOTIVE AUTOMATIC TRANSMISSIONS

[75] Inventors: Yasunobu Yamamoto, Chiryu; Mitsumasa Matsuo; Atsushi Nakagawa, both of Toyota, all of Japan

[73] Assignee: Aisin Chemical Company, Limited, Aichi, Japan

[21] Appl. No.: 922,296

[22] Filed: Jul. 6, 1978

[30] Foreign Application Priority Data

Jul. 16, 1977 [JP] Japan ............................... 52-085351
Dec. 19, 1977 [JP] Japan ............................... 52-152750

[51] Int. Cl.$^2$ ............................................ D01F 9/16
[52] U.S. Cl. ................... 264/29.4; 162/145; 162/146; 264/29.6; 264/345; 423/447.7; 423/447.9
[58] Field of Search ............. 264/29.4, 29.6, 340, 264/345, 347; 162/145–146; 423/447.7, 447.9

[56] References Cited

U.S. PATENT DOCUMENTS

| | | | |
|---|---|---|---|
| 277,846 | 5/1883 | Maxim | 264/29.4 |
| 2,045,452 | 6/1936 | Emrick | 264/29.1 |
| 2,045,453 | 6/1936 | Emrick | 264/29.1 |
| 2,922,734 | 1/1960 | Kohn et al. | 264/347 |
| 2,971,221 | 2/1961 | Schoenbeck | 264/347 |
| 3,270,846 | 9/1966 | Arledter et al. | 192/107 |
| 3,281,261 | 10/1966 | Lynch | 264/29.6 |
| 3,885,006 | 5/1975 | Hatch et al. | 264/29.1 |
| 3,998,689 | 12/1976 | Kitago et al. | 162/145 |

*Primary Examiner*—Jeffery R. Thurlow
*Attorney, Agent, or Firm*—Oblon, Fisher, Spivak, McClelland & Maier

[57] ABSTRACT

A paper based frictional material is formed by forming a paper material of a desired size from a mixture comprising wood pulp, a lubricant and an organic fiber; soaking said paper material in a binder agent, and then drying the soaked material; and heating said dried paper product to carbonize the same under conditions in which oxygen is substantially eliminated from contact with said paper material so that a material is obtained whose frictional characteristics are such that the material is useful as a clutch facing in automatic transmissions.

36 Claims, No Drawings

METHOD OF MANUFACTURING A CLUTCH FACING OF THE TYPE USED FOR AUTOMOTIVE AUTOMATIC TRANSMISSIONS

BACKGROUND OF THE INVENTION

1. Field of the Invention

The present invention relates to an improved clutch facing, and more particularly to a method of manufacturing a clutch facing of the type used for automotive automatic transmissions or the like.

2. Description of the Prior Art

Clutch facings of the type used for automotive automatic transmissions are usually made of a paper based frictional material which contains some additional components which improve the frictional qualities such as the friction coefficient of the facing, and/or the durability of the facing against wear.

The conventional method of manufacturing a paper based frictional material (hereinafter referred to as a frictional material) which is known as the wet method incorporates a resin in the liquid state as a binder agent.

Frictional materials produced by the conventional wet method are obtained by mixing a wood pulp together with a lubricant, an organic fiber, and other ingredients in a mixing device, and forming paper from the mixture with a paper machine. Thereafter, a paper object of the required shape is stamped from the paper by a paper stripper such as a crank press. The stamped paper piece is soaked in a solution of a binder agent such as a phenolic resin in a solvent and then is dried. The dried product is preheated in a drying furnace and then the pre-heated product is placed in contact with a core plate in the presence of an adhesive agent. The laminate is pressed and heated in a metal mold installed in a press molding machine, followed by heating the product in a drying furnace, thereby obtaining the complete frictional material. The purpose of heating the laminate in the drying furnace is to ensure completion of curing of the binder and adhesive agents.

The frictional material contains a lot of wood pulp and organic materials such as organic fiber and the binder agent so that a product of somewhat desirable frictional qualities can be obtained. The desirable frictional qualities are fulfilled by carbonizing portions of the wood pulp and the like. However, in the conventional method of manufacturing the frictional material, heating of the product is performed in the air, which results in oxidative deterioration of the material. Consequently, the heating step must be terminated before the desired extent of carbonization of the wood pulp and the like is attained. Accordingly, a frictional material of completely satisfactory frictional qualities is not yet available.

The conventional method described above presents other difficulties in that it brings about a low initial value of the frictional coefficient of the material, thereby resulting in the phenomenon of bedding. The term "bedding" as used herein is the quality of transmission caused by the frictional material. Because the material exhibits a low initial frictional coefficient, the frictional material may not achieve its frictional coefficient of desired constant value until after many hours of use. In the meantime a squeezing noise (crank noise) is often heard. It is believed that the crank noise is heard if the ratio of the static coefficient to the dynamic coefficient of the frictional material is above 1.30. Therefore, a need continues to exist for a method of preparing a frictional material which will immediately exhibit the desired frictional coefficient value.

SUMMARY OF THE INVENTION

Accordingly, one object of the present invention is to provide a method of manufacturing a frictional material which exhibits the desired frictional coefficient value from its initial moments of use.

Briefly, these and other objects of the present invention as hereinafter will become more readily apparent can be attained by an improvement in the wet method of manufacturing frictional materials, which comprises forming a paper material of a desired size from a mixture comprising wood pulp, a lubricant and an organic fiber; soaking said paper material in a binder agent, and then drying the soaked material; and heating said dried paper product to carbonize the same under conditions in which oxygen is substantially eliminated from contact with said paper material so that a material is obtained whose frictional characteristics are such that the material is useful as a clutch facing in automatic transmissions.

DETAILED DESCRIPTION OF THE PREFERRED EMBODIMENTS

In attempting to overcome the difficulties of the prior art heating step, an investigation has shown that the wood pulp and the other materials which are included in the frictional material are oxidized by oxygen in the air, and therefore deteriorate while the heat treatment is conducted. It is the deterioration of the frictional material which leads to the low initial value of the frictional coefficient of the frictional material and loss of other desirable qualities of the material.

The improvement of the present invention is the finding that if the paper material, whenever it is heated, is heated under the cover of a liquid, in the presence of air at reduced pressure and/or under an inert gas, then the problems presented by the heating steps in the conventional process can be overcome. The scope of the term "heated or heat treatment" includes all preheating, heating and post-heating steps to which the paper is subjected during processing.

The pre-heating step in the present process is the step in which residual solvent which has soaked into and adheres to the frictional material is removed therefrom. The pre-heating step also enables the subsequent heating step to be smoothly conducted.

The heat step in the process is the step in which the desired parts of the wood pulp and other components of the paper are carbonized without oxidative deterioration.

The post-heating step is the step in which the uncured binder agent and uncured adhesive agent which contact the paper base of the frictional material and the core plate, are completely cured.

The term "liquid" as used herein includes various types of fluids which remain in the liquid state while the temperature is increased. Suitable liquids include natural oils as well as liquids obtained from the refining and modification of petroleum or coal. The natural oil group includes non-drying, semi-drying and drying vegetable oils. Suitable non-drying oils include camellia oil, coconut oil, olive oil, castor oil and the like. Suitable semi-drying oils include soybean oil, sesame oil, rapeseed oil, cotton-seed oil and the like. Suitable drying oils include safflower oil, linseed oil, tung oils and the like.

Animal oils are not preferred because they are usually solids. However, whale oil, which is used as a lubricant, may also be used. As mentioned above, other liquids include those obtained by refining and modifying petroluem or coal, as well as other types of oils and oil-like liquids. Other non-petroleum or non-oil based oils include oils which contain silicon, fuorin oils and the like. Suitable silicone oils include modified dimethyl silicone oils, phenyl methyl silicone oils and the like. Suitable fuorin oils include furolo ethylene chloride, low polymers and the like.

Suitable oil-like liquids include plasticizers such as phosphoric acid esters, polyesters, phthalates, fatty acid-basic esters and the like. Other oil-like liquids include polyethylene glycol, polybiphenyl chloride and the like. It is most preferable to use non-drying oils or silicone oils.

Suitable gases which provide an inert gas atmosphere include such rare gases as helium, neon or argon, which belong to the inert gas group of the Periodic table, and such thermally stable gases as carbon dioxide, nitrogen and the like. Nitrogen or carbon dioxide is most preferred from the cost and operational point of view.

Another way of eliminating a reactive atmosphere from the paper while it is heated is simply to reduce the atmospheric pressure in the heating chamber by conventional means. By reducing atmospheric pressure, the concentration of oxygen in the heating chamber is reduced. When a half-finished frictional material product is heated under reduced atmospheric pressure, the lower the concentration of oxygen, the better the heat treatment becomes. The extent of pressure reduction should be decided by the quality required of the frictional material, the temperature, and the period of heat treatment. Preferably, the atmospheric pressure is reduced to less than 220 mm Hg, and most preferably, less than 70 mm Hg.

The term "carbonization" as used herein refers to the phenomenon in which the wood pulp and other components of the paper are decomposed by heat, and converted to a material filled with a certain type of carbon, that is, an amorphous carbon, while the wood pulp and the other components are heated.

The frictional material may obtain the desired frictional coefficient as mentioned above, only when carbonization is carried out to a sufficient extent. Accordingly, it is difficult to define the preferred conditions with respect to the degree of carbonization. The degree of carbonization is a function of the kind of wood pulp used as well as other components of the paper, particularly the organic fiber and the binder agent. Another factor is the temperature to which the covering liquid is heated.

When oxidation of the paper material occurs as in the prior art process, the wood pulp and other components in the paper combine with the oxygen in the air. It has no influence on the qualities of the frictional material. It has been found that oxidation of the components of the paper occurs when the heat treatment is conducted continuously for about 30 minutes at 130° C. in the air. However, the paper will undergo oxidative deterioration when continuously heated for a prolonged period of time in the presence of air. Oxidative deterioration has an adverse effect on the qualities of the frictional material. The paper product oxidatively deteriorates to a significant extent when the heat treatment is conducted continuously for about 2 hours at 200° C. in the air.

The method of the present invention will now be described in more detail. The method of the invention generally employs many conventional process steps in which a wood pulp is mixed with a lubricant, an organic fiber, and other ingredients in a mixing device and then making paper in a paper making machine. The paper is then stamped out in the required shape with a paper stripper such as a crank press and the stamped product is soaked in a solution of the binder agent such as a phenolic resin and a solvent. The heat treatment on the paper is then conducted in the presence of one of the previously mentioned liquids, under an inert gas or under reduced atmospheric pressure until a desirable frictional material is carbonized to the desired extent.

The product of the present invention can be achieved by a variety of different procedures involving different combinations of steps. For example, the soaked paper product can be dried in a drying device, followed by heating the dried product in the air, in air under diminished pressure, or under an inert gas in a pre-heating step. Thereafter, the dried product can be shaped under heat and pressure, followed by heating the formed product under an inert gas or in the air under diminished pressure. The heating and post-heating steps can be conducted at the same time.

Another example of a suitable technique is to sufficiently dry the soaked product in order to perform the pre-heating step at the same time followed by heating the dried product under an inert gas or in the air under diminished pressure in order to perform the post-heating step at the same time. Thereafter, the paper product is shaped with heat and pressure.

Yet another example of a suitable process involves sufficiently drying the soaked product in order to perform the pre-heating step at the same time followed by heating the dried product under an inert gas, or in the air under diminished pressure. Thereafter, the heated product is shaped under heat and pressure followed by heating the formed product under air, in the air under diminished pressure, or under an inert gas as the post-heating process.

Still another example of a satisfactory process involves drying the soaked paper product followed by heating the dried product in the air, in air under diminished pressure, or under an inert gas in the pre-heating step. Thereafter, the heat product is shaped under heat and pressure and the formed product is heated in the pre-heating step under air. The heated product is heated again under an inert gas, or in air under diminished pressure, in order to carry out at the same time, both the heating and post-heating steps.

In another example of the present technique, the soaked product is dried and then heated under an inert gas or in air under diminished pressure, as the pre-heating step. Thereafter, the heated product is shaped under heat and pressure and then the formed product is heated under a liquid in order to simultaneously conduct both the heating and the post-heating steps. Finally, the liquid is removed from the heated product when necessary.

Another embodiment of the present invention involves sufficiently drying the soaked product in order to simultaneously conduct the pre-heating step and then heating the dried product under a liquid. Thereafter, the liquid is removed from the heated product when necessary and the heated product is shaped under heat and pressure.

Still another embodiment of the present invention involves sufficiently drying the soaked product and then heating the dried product under a liquid. Thereafter, the liquid is removed from the heated product when necessary and then the heated product is shaped under heat and pressure.

In all of these methods, an important factor is that the wood pulp and other components of the paper product do not oxidatively deteriorate when it is pre-heated in air. The pre-heating is preferably conducted at 200° C. for less than one hour and a half.

The drying step of the present process is conducted to remove solvent of a low boiling point such as methanol from the soaked product. The solvent may adsorb and adhere to the stamped product, while the stamped product is soaked within the solution of the binder agent. The soaked product is usually dried at 30°–80° C. in the air for 20–120 minutes.

The dried product is usually pre-heated at about 120°–250° C. for 0.5–5 hours.

The heat operation is usually performed on the pre-heated product at about 120°–500° C. for 0.5–20 hours followed by the post-heating operation, which is usually conducted to form the product at about 120°–200° C. for 0.5–2 hours. In order to shape or form the product, the heated product is shaped under a pressure of 50–120 kg/cm$^2$ at 130°–200° C. for 0.5–5 minutes, with a forming machine such as a compression molding machine, or with a roll such as a pressurized roll machine.

Suitable binder agents, within the scope of the invention, include thermosetting resins such as phenolic and polyimide resins.

After the paper product is soaked in the binder it is usually dried. From the viewpoint that in normal operation of the clutch in automatic transmissions, any liquid in the paper product will dissolve in the lubricant of the transmission, it is not necessary to remove excess binder liquid. The liquid and the transmission lubricant do not have adverse effects on each other. However, liquid is removed from the soaked product because the liquid swells the frictional material, which is a factor complicating operational procedures. Thus, the removal of the liquid from the soaked product is necessary. An example of a satisfactory liquid removal procedure is as follows. The heated product containing liquid is soaked in a solvent of a low boiling point such as methanol, ethanol, xylol, toluol or the like to extract the liquid. The extracted product is dried in air or in an inert gas. In an alternative procedure the heated product containing liquid is pressed in a machine such as a roll or compression molding machine to squeeze the liquid from the heated product. The two procedures just described can be quite effectively used in combination to remove liquid from the frictional material.

The term "half-finished frictional material product" as used herein can refer to the soaked product mentioned above, the dried product, the pre-heated product, or the shaped product.

Having generally described the invention, a more complete understanding can be obtained by reference to certain specific examples, which are included for the purpose of illustration only and are not intended to be limiting unless otherwise specified.

EXAMPLE 1

A fibrous wood pulp, clay, and a diatomaceous earth were mixed in a mixing device. The mixture was then made into a paper in a paper machine, and the paper obtained was stamped into the shape of a loop with a crank press. The stamped product was soaked in a solution of a phenolic resin and methanol for one minute. The soaked product was dried at 70° C. in air, and then pre-heated at 160° C. in air for 50 minutes. The pre-heated product was contacted with a core plate in the presence of an adhesive agent. The laminate was then shaped at a pressure of 50 kg/cm$^2$ at 170° C. for 2 minutes in a metal mold of a press molding machine. The formed product was soaked in pre-heated coconut oil at 260° C. for 5 hours and then the heated product was cooled in air, thereby yielding a complete frictional material.

EXAMPLE 2

A shaped product was obtained by the same process described in Example 1. The paper obtained was soaked in pre-heated soybean oil at 200° C. for 7 hours. The heated product obtained was immersed and cooled in soybean oil at room temperature, thereby yielding the product frictional material.

EXAMPLE 3

A shaped product was obtained by the procedure described in Example 1. The product obtained was soaked in pre-heated castor oil at 270° C. for 3 hours. The heated product was then pressed in a compression molding machine at 50 kg/cm$^2$ and room temperature for 1 hour, thereby removing the greater parts of the castor oil from the heated product.

EXAMPLE 4

A shaped product was obtained by the procedure described in Example 1. The product obtained was soaked in tricresyl phosphate (plasticizer) for 8 hours. The heated product obtained was cooled in the air at room temperature until it reached room temperature. The cooled product was immersed in methanol at room temperature to extract the tricresyl phosphate therefrom. The extracted product was dried in air at room temperature to achieve the product frictional material.

EXAMPLE 5

A shaped product was obtained by the procedure described in Example 1. The product obtained was allowed to stand in the air at 170° C. for 1 hour. Thereafter, it was dipped in pre-heated dimethylsilicone oil at 250° C. for 5 hours. The heated product obtained was cooled in the air at room temperature to achieve the desired frictional material product.

EXAMPLE 6

A shaped product was obtained by the procedure described in Example 1. It was allowed to stand in nitrogen gas at 170° C. for 1 hour. The product was then dipped in pre-heated methylphenylsilicone oil at 250° C. for 5 hours. The heated product obtained was pressed at 50 kg/cm$^2$ and 170° C. for one minute in a compression molding machine to remove the greater parts of the methylphenylsilicone oil therefrom, thereby obtaining the desired frictional material.

EXAMPLE 7

A soaked product was obtained by the procedure described in Example 1. The product obtained was dried in the air at 60° C. for one hour. The dried product was pre-heated in the air at 160° C. for one hour. The pre-heated product was contacted with a core plate in the presence of adhesive agent. The contacted product was shaped at 100 kg/cm² and 170° C. for 2 minutes. The shaped product was heated in pre-heated nitrogen gas at 270° C. for 5 hours. The heated product was cooled in the air at room temperature to yield the desired frictional material product.

EXAMPLE 8

A soaked product was obtained by the same procedure described in Example 1. It was then dried in the air at 80° C. for 1 hour. The dried product was heated in pre-heated nitrogen gas at 280° C. for 3 hours. The heated product was then contacted with a core plate in the presence of an adhesive agent. The laminate obtained was shaped at 100 kg/cm² and 170° C. by a compression molding machine for 2 minutes. The shaped product was post-heated under a pre-heated nitrogen gas at 180° C. for one hour, and then was cooled in the air to yield the desired frictional material product.

EXAMPLE 9

A soaked product was obtained by the same procedure described in Example 1. It was then dried in the air at 70° C. for 30 minutes. The dried product was pre-heated in the air of 160° C. for 50 minutes, and the pre-heated product obtained was contacted with a core plate in the presence of adhesive agent. The laminate obtained was shaped at 50 kg/cm² and 170° C. for 2 minutes by a compression molding machine. The formed product was post-heated under pre-heated nitrogen gas at 250° C. for 8 hours to yield the desired compression frictional material product.

EXAMPLE 10

A pre-heated product was obtained by the same procedure described in Example 9. The product was heated under pre-heated nitrogen gas at 300° C. for 1 hour. The heated product obtained was contacted with a core plate in the presence of an adhesive agent. The laminate obtained was shaped at 100 kg/cm² and 200° C. by a compression molding machine for 2 minutes. The shaped product was post-heated under pre-heated air at 200° C. for one hour, and then was cooled in air at room temperature to yield the desired complete frictional material product.

EXAMPLE 11

A soaked product was obtained by the same procedure described in Example 1. It was then dried in the air at 60° C. for one hour. The dried product was pre-heated in the air at 160° C. for one hour and then was contacted with a core plate in the presence of an ahesive agent. The laminate obtained was shaped at 100 kg/cm² and 170° C. for 2 minutes by a compression molding machine. The formed product was heated in the air under a diminished pressure of 100 mm Hg at 270° C. for 2 hours. The heated product gradually was cooled in the air under diminished pressure and the desired complete frictional material product was obtained.

EXAMPLE 12

A soaked product was obtained by the same procedure described in Example 1. It was then dried in the air at 80° C. for one hour. The dried product was heated in the air under diminished pressure of 60 mm Hg at 280° C. for 2 hours. The heated product was contacted with a core plate in the presence of an adhesive agent, and the laminate obtained was shaped at 100 kg/cm² and 170° C. for 2 minutes by a compression molding machine. The shaped product was post-heated in the air under diminished pressure of 60 mm Hg at 180° C. for one hour. The post-heated product gradually was cooled and the desired complete frictional material product was obtained.

EXAMPLE 13

A soaked product was obtained by the same procedure described in Example 1. The product was then dried in the air at 70° C. for 30 minutes. The dried product obtained was pre-heated in the air at 160° C. for 50 minutes, and then contacted with a core plate in the presence of an adhesive agent. The contacted product was shaped at 50 kg/cm² and 170° C. for 2 minutes by a compression molding machine. The shaped product was heated in the air under a diminished pressure of 20 mm Hg at 300° C. for 3 hours. The heated product gradually was cooled in the air under diminished pressure, thereby yielding the desired complete frictional material product.

EXAMPLE 14

A pre-heated product was obtained by the same procedure described in Example 13. It was then heated in the air under diminished pressure at 150 mm Hg at 250° C. for 5 hours. The heated product was contacted with a core plate in the presence of an adhesive agent, and then the laminate obtained was shaped at 50 kg/cm² and 200° C. for 2 minutes by a compression molding machine. The formed product was post-heated in the air at 170° C. for one hour and then gradually cooled to yield the desired complete frictional material product.

COMPARISON EXAMPLE 1

A shaped product described above was obtained by the same procedure described in Example 1. The product was post-heated in pre-heated air at 180° C. for one hour to yield a complete frictional material product.

TABLE 1

| Number of ( ) clutch operations | Amount of wear (mm) | | Stopping time (sec.) | | | | | | | | |
|---|---|---|---|---|---|---|---|---|---|---|---|
| | 2000 | 5000 | 25 | 100 | 200 | 500 | 1000 | 2000 | 3000 | 4000 | 5000 |
| Example 1 | 0.042 | 0.062 | 1.05 | 1.03 | 1.00 | 1.01 | 1.01 | 1.01 | 1.01 | 1.00 | 1.01 |
| Example 2 | 0.039 | 0.058 | 1.04 | 1.02 | 1.02 | 1.01 | 1.00 | 1.01 | 0.99 | 1.00 | 1.01 |
| Example 3 | 0.036 | 0.054 | 1.00 | 1.02 | 1.01 | 1.00 | 1.01 | 1.00 | 1.00 | 1.02 | 1.00 |
| Example 4 | 0.039 | 0.058 | 0.98 | 0.97 | 0.99 | 1.01 | 1.00 | 1.01 | 1.01 | 1.00 | 1.00 |
| Example 5 | 0.030 | 0.048 | 1.01 | 1.03 | 1.02 | 1.02 | 1.01 | 1.01 | 1.02 | 1.00 | 1.01 |
| Example 6 | 0.045 | 0.057 | 0.97 | 0.98 | 1.00 | 1.01 | 0.99 | 1.00 | 1.02 | 1.01 | 1.01 |
| Example 7 | 0.032 | 0.053 | 1.03 | 1.03 | 1.05 | 1.03 | 1.02 | 1.03 | 1.03 | 1.02 | 1.03 |
| Example 8 | 0.028 | 0.046 | 1.00 | 1.01 | 1.01 | 1.00 | 1.02 | 1.01 | 1.00 | 1.01 | 1.01 |
| Example 9 | 0.033 | 0.052 | 1.04 | 1.05 | 1.05 | 1.02 | 1.01 | 1.00 | 1.03 | 1.02 | 1.03 |
| Example 10 | 0.031 | 0.049 | 1.01 | 1.03 | 1.00 | 0.99 | 1.00 | 1.00 | 0.99 | 1.01 | 1.00 |
| Example 11 | 0.032 | 0.049 | 1.03 | 1.02 | 1.03 | 1.04 | 1.04 | 1.04 | 1.04 | 1.03 | 1.03 |

TABLE 1-continued

| Number of () clutch operations | Amount of wear (mm) | | Stopping time (sec.) | | | | | | | | |
|---|---|---|---|---|---|---|---|---|---|---|---|
| | 2000 | 5000 | 25 | 100 | 200 | 500 | 1000 | 2000 | 3000 | 4000 | 5000 |
| Example 12 | 0.030 | 0.045 | 1.01 | 1.01 | 1.00 | 1.02 | 1.01 | 1.00 | 1.01 | 1.02 | 1.02 |
| Example 13 | 0.039 | 0.058 | 0.98 | 0.98 | 0.99 | 1.00 | 0.99 | 1.00 | 1.00 | 1.01 | 1.00 |
| Example 14 | 0.033 | 0.045 | 1.05 | 1.04 | 1.04 | 1.02 | 1.02 | 1.03 | 1.03 | 1.02 | 1.02 |
| Comparison Example 1 | 0.040 | 0.060 | 1.11 | 1.09 | 1.08 | 1.04 | 1.05 | 0.99 | 1.00 | 0.99 | 1.01 |

TABLE 2

| Number of ) clutch operations | Ratio of static and dynamic coefficients ($\mu s/\mu d$) | | | | | | | | |
|---|---|---|---|---|---|---|---|---|---|
| | 25 | 100 | 200 | 500 | 1000 | 2000 | 3000 | 4000 | 5000 |
| Example 1 | 1.30 | 1.28 | 1.25 | 1.16 | 1.15 | 1.12 | 1.10 | 1.13 | 1.11 |
| Example 2 | 1.26 | 1.21 | 1.20 | 1.18 | 1.18 | 1.13 | 1.09 | 1.10 | 1.09 |
| Example 3 | 1.18 | 1.19 | 1.16 | 1.15 | 1.12 | 1.10 | 1.09 | 1.10 | 1.10 |
| Example 4 | 1.27 | 1.23 | 1.24 | 1.20 | 1.19 | 1.15 | 1.16 | 1.13 | 1.13 |
| Example 5 | 1.20 | 1.27 | 1.18 | 1.16 | 1.16 | 1.14 | 1.13 | 1.14 | 1.15 |
| Example 6 | 1.25 | 1.23 | 1.21 | 1.17 | 1.16 | 1.13 | 1.14 | 1.12 | 1.14 |
| Example 7 | 1.20 | 1.20 | 1.18 | 1.17 | 1.15 | 1.16 | 1.13 | 1.15 | 1.12 |
| Example 8 | 1.16 | 1.15 | 1.14 | 1.12 | 1.13 | 1.12 | 1.10 | 1.12 | 1.10 |
| Example 9 | 1.19 | 1.21 | 1.17 | 1.18 | 1.15 | 1.13 | 1.11 | 1.14 | 1.13 |
| Example 10 | 1.19 | 1.16 | 1.15 | 1.13 | 1.14 | 1.10 | 1.12 | 1.11 | 1.09 |
| Example 11 | 1.24 | 1.21 | 1.20 | 1.19 | 1.17 | 1.15 | 1.16 | 1.18 | 1.15 |
| Example 12 | 1.17 | 1.15 | 1.14 | 1.14 | 1.15 | 1.14 | 1.13 | 1.13 | 1.10 |
| Example 13 | 1.18 | 1.16 | 1.13 | 1.13 | 1.11 | 1.10 | 1.08 | 1.10 | 1.09 |
| Example 14 | 1.28 | 1.25 | 1.20 | 1.15 | 1.16 | 1.15 | 1.12 | 1.13 | 1.13 |
| Comparison Example 1 | 1.52 | 1.59 | 1.30 | 1.17 | 1.17 | 1.12 | 1.11 | 1.10 | 1.13 |

In the tests above a body is revolved at a dynamic engagement of 3.600 r.p.m. and a moment of an inertia of 2.52 kg.cm.sec$^2$ and then is braked and stopped by a clutch of an inside diameter of 103 mm, an outside diameter of 127 mm, and a pushing weight of 313 kilograms. The rotational energy (kinetic energy:1786 kg.cm) thereof is absorbed by the clutch which is a clutch of the type used for automotive automatic transmissions. The oil present is maintained at a temperature of about 120° C. The cycle time is 30 seconds, and a series of 5000 cycles were conducted for each material tested. The stopping time, the amount of wear, the static coefficient, and the dynamic coefficient were measured through the test mentioned above. The average of the measured values (5 times each) is shown in Tables 1 and 2.

In the evaluation of the qualities shown in Tables 1 and 2, a value of wear less than 0.06 mm is considered to be excellent after 5000 cycles, while 0.06–0.08 mm is considered to be good, and above 0.08 is poor.

In the maximum and the minimum values of the stopping time through 1 to 5000 cycles, a value of the maximum value less than 1.10 and a minimum above 0.97 is considered to be excellent, while 1.15 and 0.95 is considered to be good. A maximum value above 1.15 is considered to be poor.

In the maximum value of the ratio of static and dynamic coefficients, a value less than 1.20 is considered to be excellent through 1 to 5000 cycles, while a value of 1.20–1.30 is good, and above 1.30 is poor.

Having now fully described the invention, it will be apparent to one of ordinary skill in the art that many changes and modifications can be made thereto without departing from the spirit or scope of the invention as set forth herein.

What is claimed as new and intended to be secured by Letters Patent of the United States is:

1. A method of manufacturing a paper based frictional material, comprising: forming a paper material of a desired size from a mixture comprising at least wood pulp; soaking said paper material in a binder agent, and then drying the soaked material; and heating said dried paper product at 120°–500° C. for 0.5–20 hours to carbonize a portion of said wood pulp under conditions in which oxygen is substantially eliminated from contact with said paper material by removing air over said product by reducing the atmospheric pressure, by covering a material with a liquid or by maintaining said material under inert atmosphere, so that a material is obtained whose frictional characteristics are such that the material is useful as a clutch facing in automatic transmissions.

2. The method of claim 1, wherein said soaked material is dried at a temperature sufficient to pre-heat the material and then said dried material is heated in said heating step under a liquid followed by shaping said heated material under heat and pressure.

3. The method of claim 1, wherein said liquid is a natural oil.

4. The method of claim 3, wherein said natural oil is a vegetable oil.

5. The method of claim 4, wherein said vegetable oil is a non-drying oil.

6. The method of claim 5, wherein said non-drying oil is camellia oil, coconut oil, olive oil, or castor oil.

7. The method of claim 4, wherein said vegetable oil is a semi-drying oil.

8. The method of claim 7, wherein said semi-drying oil is soybean oil, sesame oil, rapeseed oil, or cottonseed oil.

9. The method of claim 4, wherein said vegetable oil is a drying oil.

10. The method of claim 9, wherein said drying oil is safflower oil, linseed oil, or tung oil.

11. The method of claim 3, wherein said liquid is whale-oil.

12. The method of claim 3, wherein said liquid is a fluid whose temperature may be increased, and is obtained from the refining of petroleum or coal.

13. The method of claim 12, wherein said fluid is a silicone oil.

14. The method of claim 13, wherein said silicone oil is a dimethyl or phenylmethyl-silicone oil.

15. The method of claim 12, wherein said fluid is a fuorin oil.

16. The method of claim 15, wherein said fuorin oil is a furolo ethylene chloride low polymer.

17. The method of claim 12, wherein said fluid is a plasticizer.

18. The method of claim 17, wherein said plasticizer is a phosphoric ester, a polyester, a phthalate, or a fatty acid-basic ester.

19. The method of claim 12, wherein said fluid is a polyethylene glycol or a polybiphenyl chloride.

20. The method of claim 1, wherein said inert gas is a rare gas of the periodic table of the elements.

21. The method of claim 20, wherein said rare gas is helium, neon, or argon.

22. The method of claim 1, wherein said inert gas is carbon dioxide or nitrogen.

23. The method of claim 1, wherein, after drying said soaked material, said heating step is conducted by heating the dried material under a liquid and thereafter the liquid is removed and the material is shaped under heat and pressure.

24. The method of claim 1, wherein said material is heated at about 200°–350° C.

25. The method of claim 24, wherein said material is heated at about 250°–300° C.

26. The method of claim 1, wherein excess liquid is removed from said soaked material prior to drying.

27. The method of claim 1, wherein said material is heated for about 2–8 hours.

28. The method of claim 27, wherein said material is heated for about 2–5 hours.

29. The method of claim 1, wherein said air is diminished to a pressure less than 220 mm Hg.

30. The method of claim 29, wherein said air is diminished to a pressure less than 70 mm Hg.

31. The method of claim 1, wherein said material contains an organic compound.

32. The method of claim 31, wherein said material is heated, and thereafter a portion thereof is carbonized.

33. The method of claim 1, which further comprises shaping said heated material under heat and pressure and then heating said shaped material with the substantial exclusion of oxygen from said shaped paper material.

34. The method of claim 1, wherein said material is preheated when dried while excluding oxygen; and further comprising shaping said material under heat and pressure and then conducting said heating step.

35. The method of claim 1, which further comprises, after drying the soaked material, heating the dried material in air, under reduced atmospheric pressure or under an inert gas, shaping the heated product under heat and pressure followed by preheating said shaped material in air, and then conducting said heating step with the material under an inert gas or under conditions of reduced atmospheric pressure.

36. The method of claim 1, which further comprises, after drying the soaked material, pre-heating the material under an inert gas or under reduced atmospheric pressure and then conducting said heating step of the shaped material under a liquid cover.

* * * * *